United States Patent
Smith et al.

(10) Patent No.: US 10,341,348 B2
(45) Date of Patent: Jul. 2, 2019

(54) ONBOARDING AND ACCOUNTING OF DEVICES INTO AN HPC FABRIC

(71) Applicant: Intel Corporation, Santa Clara, CA (US)

(72) Inventors: Ned M. Smith, Beaverton, OR (US); Barry E. Huntley, Hillsboro, OR (US); Simon Hunt, Naples, FL (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 15/392,379

(22) Filed: Dec. 28, 2016

(65) Prior Publication Data

US 2018/0183796 A1 Jun. 28, 2018

(51) Int. Cl.
*H04L 29/06* (2006.01)
*H04L 29/08* (2006.01)

(52) U.S. Cl.
CPC .............. *H04L 63/10* (2013.01); *H04L 67/10* (2013.01); *H04L 63/0428* (2013.01)

(58) Field of Classification Search
CPC ..... H04L 63/10; H04L 63/0428; H04L 49/10; H04L 49/20; H04L 67/10
USPC .......................................................... 726/4
See application file for complete search history.

(56) References Cited

U.S. PATENT DOCUMENTS

| | | | |
|---|---|---|---|
| 2013/0003608 A1* | 1/2013 | Lei | H04L 12/462 370/256 |
| 2014/0026161 A1* | 1/2014 | Zheng | H04N 21/25816 725/29 |

\* cited by examiner

*Primary Examiner* — Michael S McNally
(74) *Attorney, Agent, or Firm* — Schwegman Lundberg & Woessner, P.A.

(57) ABSTRACT

A method to onboard a slave node to a high performance computing system that includes a fabric switch network that includes a fabric switch master and a group of slave nodes, wherein the fabric switch master is configured to route messages between slave nodes of the group comprising: receiving a fabric switch master address message, at an onboarding slave node, over an external network; providing an identification message, by the onboarding slave node, over the fabric switch network; receiving the identification message, at the fabric switch master, over the fabric switch network; providing the permission message, by the fabric switch master, over the fabric switch network; and receiving, a permission message, at the onboarding slave node, over the fabric switch network.

21 Claims, 6 Drawing Sheets

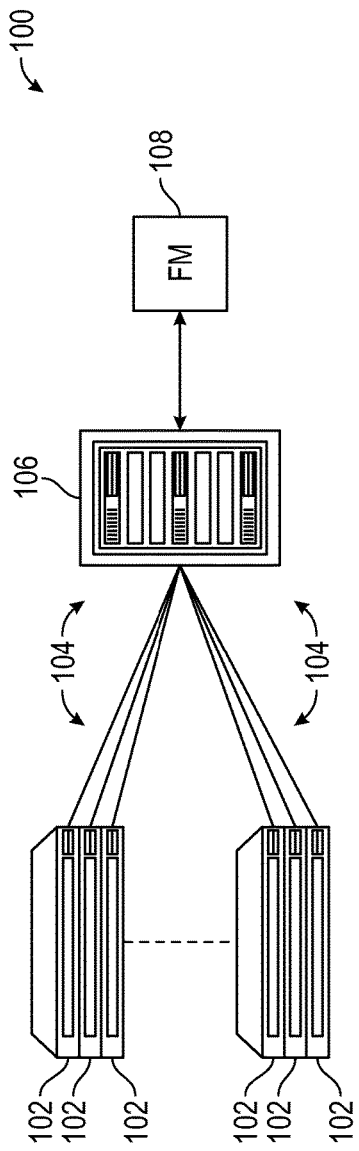
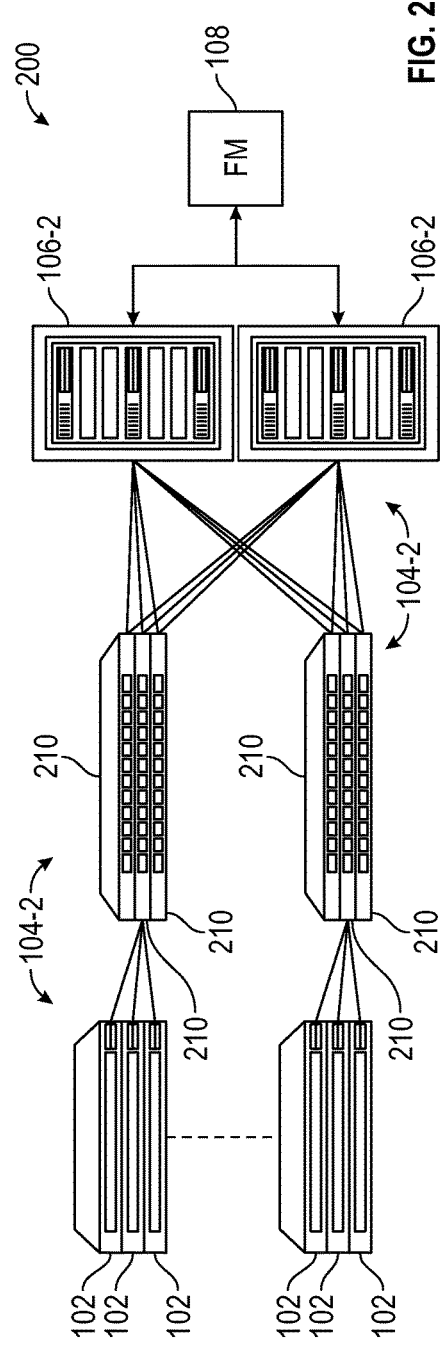
FIG. 1
FIG. 2

ONBOARDING AND ACCOUNTING OF DEVICES INTO AN HPC FABRIC

BACKGROUND

A typical fabric switch includes a central switch having many ports surrounded by a variety of fabric devices and resources for high performance computing (HPC) such as CPU, GPU, memory, storage, peripherals (which may include user workstations). HPC fabrics often integrate a fabric controller into a central processing unit (CPU) package making it both high performing and easily integrated into an ad-hoc mesh of devices and peripherals. A threat facing ad-hoc mesh systems built around HPC fabrics is the potential for rogue devices being able to inject malicious packets or act as clandestine man-in-the-middle devices observing traffic that passes over the fabric. In addition, fabric computing business models are taking fabric computing out of the 'glass houses' of single owner environments and placing them in shared computing environments where cooperative organizations may add capacity overtime (e.g. memory, CPU, GPU, peripherals, storage etc. . . . ). This presents a challenge in terms of accounting to keep track of resource utilization by each fabric endpoint.

BRIEF DESCRIPTION OF THE DRAWINGS

FIG. 1 is an illustrative drawing representing an example first high performance computing (HPC) system in accordance with some embodiments.

FIG. 2 is an illustrative drawing representing an example second HPC system in accordance with some embodiments.

DESCRIPTION OF EMBODIMENTS

Figure 3:
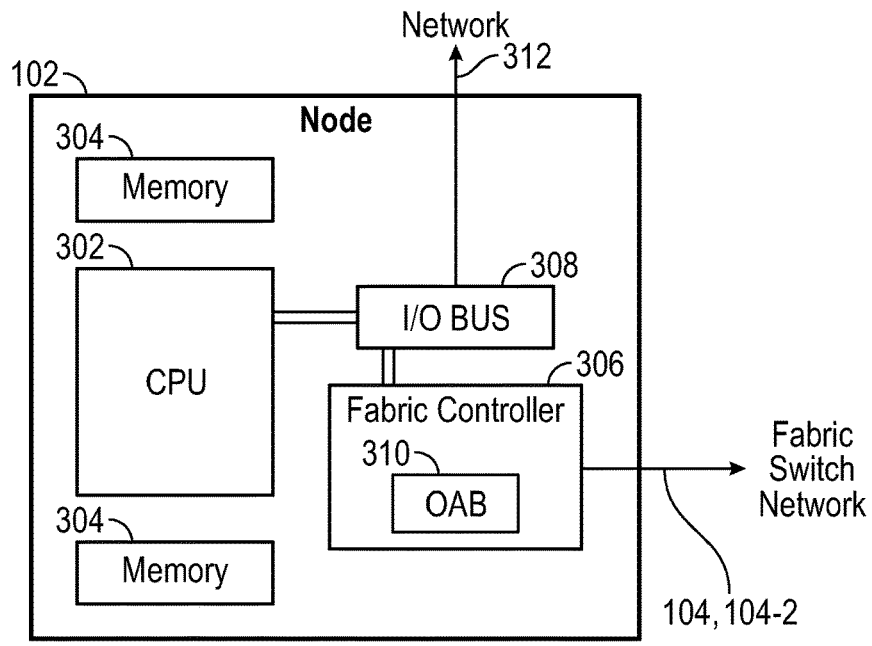
FIG. 3 is an illustrative drawing representing a node in accordance with some embodiments.

The following description is presented to enable any person skilled in the art to onboard a node onto a high performance computing system that includes a fabric switch network. Various modifications to the embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings.

FIG. 1 is an illustrative drawing representing an example first high performance computing (HPC) system 100 in accordance with some embodiments. The system 100 includes a plurality of nodes 102, a fabric switch network 104, and a fabric manager 106. The fabric switch network 104 includes a director switch system 108 that permits creation of selectable different topologies to connect a scalable number of endpoint nodes 102. The director switch system 108 is coupled to provide a communication fabric to selectably communicate messages among different groups of multiple nodes. The fabric manager 106 provides centralized provisioning and monitoring of fabric resources. In particular, for example, the fabric manager 106 is operative to configure the director switch system 108 to partition communications among nodes 102 over the fabric. The first system 100 is sometimes referred to as a three-hop system because three hops are required to send a messages between two nodes: from a sending node 102 to the director switch system 108, and finally, to a receiving node 102.

FIG. 2 is an illustrative drawing representing an example second HPC system 200 in accordance with some embodiments. The second system 200 includes the plurality of nodes 102, a fabric switch network 104-2 and the fabric manager 108. The fabric switch network 104-2 includes a plurality of edge switches 210 and a director switch network 106-2 that permits creation of selectable different topologies to connect a scalable number of endpoint nodes. Each edge switch 210 is coupled to selectably communicate messages among different groups of multiple nodes 102 and communicate messages with the director switch network 106-2. The director switch network 106-2 is coupled to selectably communicate messages among the edge switches 210. The edge switches 210 and the director switch network 106-2 provide a communication fabric to selectably communicate messages among different groups of multiple nodes 102. The fabric manager 108 is operative, for example, to configure the plurality of edge switches 210 and the director switch network 106-2 to partition communications among nodes 102. The second system 200 is sometimes referred to as five-hop system because five hops are required to send a message between two nodes: from a sending node 102 to an edge switch 210, to the director switch network 106-2, back to an edge switch 210, and finally, to a receiving node 102.

FIG. 3 is an illustrative drawing representing a node 102 in accordance with some embodiments. The node 102 includes a central processing unit (CPU) 302, a memory storage device 304, a fabric controller 306, a bus circuit 308 and a slave onboarding and accounting (OAB) logic block 310. The CPU 302 is programmable to perform general computing tasks, service tasks and/or management tasks. The memory storage device 304 provides local working memory for use by the CPU 302. The fabric controller 306 provides fabric connectivity for the nodes to communicate messages over the fabric switch network 104, 104-2. The bus circuit 308 is configured to provide an external communication path between the CPU 302 and the fabric controller 306. The bus circuit 308 is configured to provide an input/output (I/O) communication path 312 over which the CPU 302 and the fabric controller 306 may communicate over an external network (not shown), such as the Internet or a local area network with external devices (not shown) outside the fabric switch network 104, 104-2. In some embodiments, the bus circuit 308 comprises a PCI bus. The slave OAB logic circuit 310 is discussed more fully below.

Figure 4:
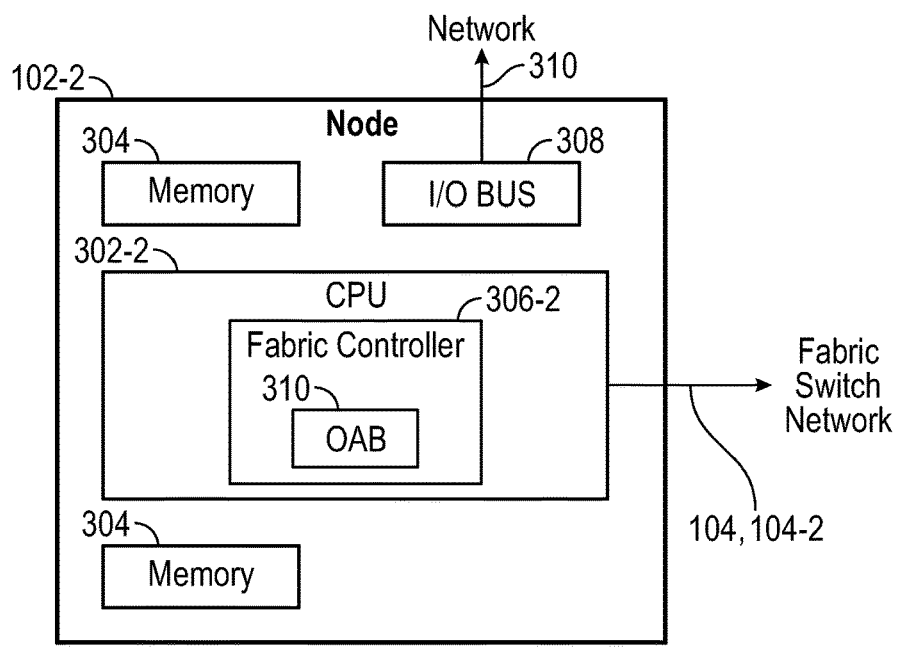
FIG. 4 is an illustrative drawing representing an alternative node in accordance with some embodiments.

FIG. 4 is an illustrative drawing representing an alternative node 102-2 in accordance with some embodiments. The node 102 and the alternative node 102-2 are generally similar except that in the alternative node 201-2, the CPU 302-2 and the fabric controller 306-2 are integrated within a single integrated circuit to provide closer operative coupling between them. The bus circuit 308 of the alternative node 102-2 is configured to provide an external I/O communication network 312 on which the CPU 302-2 and the integrated fabric controller 306-2 may communicate over an external network (not shown), such as the Internet or a local area network with external devices (not shown) outside the fabric switch network 104, 104-2.

Each node 102, 102-2 may be configured to act as a computing node, a service node or a management node through programming of its CPU 302, 302-2. Nodes programmed to act as compute nodes may be used for collaborate concurrent processing of tasks. Nodes programmed to act as service nodes may implement storage, specialized processing such as cryptography, graphics rendering, machine learning, computer vision, for example. Nodes programmed to act as management nodes may implement BMC functionality, hot-plug, failover-recovery, for example.

Figure 5:
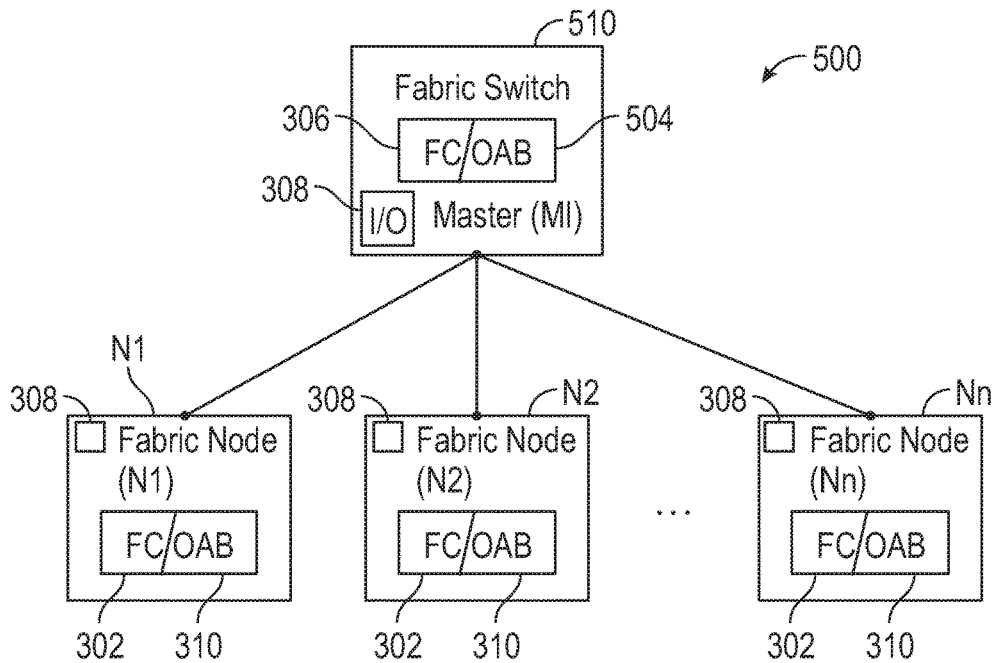
FIG. 5 is an illustrative drawing representing an example fabric switch partition of an HPC system in accordance with some embodiments.

FIG. 5 is an illustrative drawing representing an example fabric switch partition 500 of an HPC system 100, 200 in accordance with some embodiments. The example fabric switch partition 500 includes a fabric switch master 510 configured to switch messages among a group of slave nodes N1, N2 . . . Nn. The fabric switch master 510 includes a fabric controller 302 to communicate with the slave nodes N1, N2 . . . Nn and I/O bus circuitry 308 to communicate with the external communication network 312 as described above. In the example three-hop system 100, the fabric switch partition 500 includes a fabric switch master 510 partitioned from within the director switch system 104. In the example five-hop system 200, the fabric switch partition 500 includes a fabric switch master 510 partitioned from among the edge switches 210 and the director switch network 104-2.

In operation, slave nodes N1, N2 . . . Nn within the fabric switch partition 500 communicate with each other via the fabric switch master 510. A slave node, e.g., N1, within the partition 500 sends, over its fabric controller 302 to the fabric switch master 510, a message addressed to another slave node, e.g., N2, within the partition 500. The fabric switch master 510 receives the message and sends it to the fabric controller 302 of the slave node, e.g., N2, to which the message is addressed. It will be appreciated that although only a single partition 500 and a single fabric switch master 510 are shown, an HPC 100, 200 may include a multiplicity of different partitions.

In addition to circuitry to provide connectivity required to communicate messages over the fabric switch network 104, 104-2, the fabric controllers 302, 302-2 of the slave node endpoints N1, N2 . . . Nn and the fabric switch master 510 also include slave OAB logic circuit blocks 310 and master logic blocks 504, respectively. The slave OAB logic blocks 310 and the master OAB logic block 504 ensure that these slave nodes may be safely onboarded and their accounting identity safely created. The slave and master OAB logic blocks 310, 504 are hardened against software attacks and most hardware attacks.

The fabric controllers 302, 302-2 in some embodiments are implemented as application specific integrated circuits (ASICs). The slave and master OAB logic blocks 310, 504 may be implemented directly in a fabric controller ASIC or may be implemented as a field programmable gate array (FPGA) that integrates with fabric controller ASIC. More particularly, for example, the slave and master OAB logic blocks 310, 504 may be implemented in an FPGA that integrates closely with the fabric controller ASIC so as to allow flexibility in how accounting information is collected and stored. In some embodiments, for example, there may be custom accounting algorithms that charge a customer based on a particular pattern of usage or based on a pattern of usage by a particular set of nodes. For example, if a first set of nodes require a certain subledger accounting (SLA) while a second set of nodes requires a different SLA, then the accounting logic in the OABs of the first and second sets of nodes will be configured differently. Moreover, for example, each node may be associated with a unique accounting identifier that may be used to track node utilization statistics across the various fabric connected nodes. Usage statistics subsequently may be tapped for billing or charge-back purposes. A nodes' unique accounting identity and its usage statistics may be incorporated into a fabric packet structure so as to be transparent to workload routing optimization strategies. In other words, accounting information such a node's accounting identifiers and a node's usage statistics is collected and transmitted in the course of routine package messages. Usage statistics may be digitally signed giving them non-repudiation properties—also useful for billing and charge-back accounting.

Table A lists certain information used during onboarding of a slave node, e.g., N1, N2, . . . Nn, to a fabric switch network 104, 104-2. Table A also lists some information that is used when communicating messages among nodes during normal operation for accounting purposes.

TABLE A

| Onboarding and Accounting Information |
| --- |
| Enhanced Privacy Identifier (EPID) |
| Onboarding universally unique identifier (UUID) |
| Accounting UUID |
| Accounting statistics |
| Reporting key(s) |

A master's OAB logic 504 and a slave node's OAB 310 contain complementary logic used to implement a node onboarding protocol. A node's OAB 310 includes a manufacture certificate that is used to attest the node to the Master's OAB. Attestation keys may include an EPID (Enhanced Privacy ID) or traditional asymmetric key or PIN-based "pairing" techniques. The onboarding UUID is used to associate the node instance with its manifest and to provide an indication of its possession history, e.g., a chain of physical and/or legal title. An accounting UUID is assigned by a fabric network master to each of its slave nodes. Nodes cooperate to track usage statistics which are accumulated by each node's OAB 310. The node OABs 310 may report statistics securely using a reporting key.

Table B lists certain information provided within a manifest document structure that provides a history of possession associated with a slave node and is used during onboarding of the slave node to a fabric switch network.

TABLE B

Onboarding UUID
Legal Ownership transfer history and RFID and electronic tracking history In some embodiments, the manifest structure maintains a history of signatures of legal owners who may be involved during the supply and retail handling of the device as it moves from vendor to customer. Moreover, the manifest structure provides a record of RFID tag tracking information collected as the node moves through a supply chain. In some embodiments, the node OAB implements an owner transfer interface that creates a new onboarding UUID for the next transfer. Thus, a new unique onboarding UUID is for a node created for each onboarding of the node to a fabric switch network 104, 104-2.

During onboarding of a slave node to a fabric switch network 104, 104-2, an onboarding node, e.g., N1, and a fabric switch master, e.g., 510, that is identified as the node's new master exchange information pursuant to protocols implemented in their respective slave and master OAB circuits 310, 504 to authenticate the onboarding node N1 to its new fabric switch master 510 and to assign an accounting identifier to the node N1. The protocols involve external communications (i.e. sending and receiving messages outside the fabric switch network) with a rendezvous server 802, discussed below, over a network, e.g., network 312, external to the fabric switch network 104, 104-2. In some embodiments, the rendezvous server 802 typically includes A rendezvous server allows a vendor of a node and the purchaser of the node to recognize that node and count it against a purchase order of nodes distributed by the vendor to the purchaser.

Figure 6:
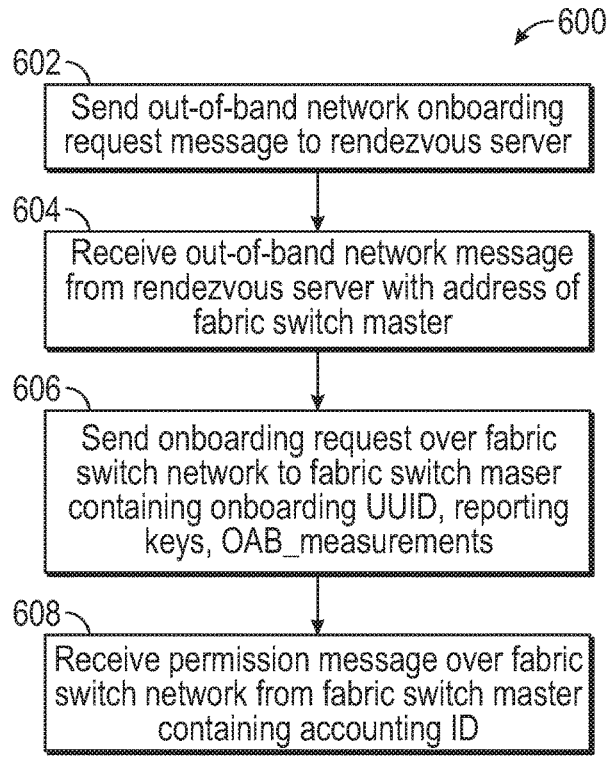
FIG. 6 is an illustrative flow diagram representing an onboarding process performed by the OAB circuit of an onboarding node.

FIG. 6 is an illustrative flow diagram representing an onboarding process 600 performed by the OAB circuit 310 of an onboarding slave node, e.g., N1. The flow diagram represents configuration of logic of the onboarding slave node's OAB circuit 310. In block 602, the slave node's OAB logic circuit 310 sends an external message over its I/O circuit 308 to a rendezvous server 802 to request onboarding to a fabric switch network 104, 104-2. In block 604, the onboarding slave node's OAB 310 receives from the rendezvous server 802 via the nodes's I/O circuit 308 an address within the fabric switch network 104, 104-2 of the onboarding node's new fabric switch master 510. The address may include an internet protocol (IP) address and a fabric network address. In block 606, the onboarding slave node's OAB 310 creates and sends over the fabric switch network 104, 104-2 an encrypted onboarding request message addressed to the fabric switch master 510 that includes the node's onboarding UUID, certain OAB measurement information and the node's reporting key(s) $K_{N1}$. OAB measurement information may include an indication of the firmware running in the OAB (to determine trust); what objects are protected by the OAB, specifically cryptographic keys, trust anchors and policies; what hardware is used to construct the OAB. This information may be processed (formatted in machine readable form such as XML, JSON, YANG, for example, and integrity hash computed and signature of hash applied) for disclosure to a verifier. The slave node's OAB logic 310 encrypts the onboarding request message with an encryption key, $K_{MFG}$, that is indicative of its EPID to protect the message from discovery by bad guys. In block 608, the onboarding slave node N1's OAB 310 receives an onboarding permission message from the fabric switch master 510 that includes. The onboarding node's reporting key(s) $K_{N1}$, and an accounting identifier, $N1_{AcctID}$ assigned to it by the master 510. The onboarding slave node N1 stores the accounting identifier for use in the future after the onboarding slave node N1 has successfully boarded the fabric switch network 104, 104-2, to identify the slave node N1 within messages sent by it during normal operation. Upon receipt of the onboarding permission message, the onboarding slave node N1 may begin normal operation of exchanging messages with other nodes within the fabric switch network.

Figure 7:
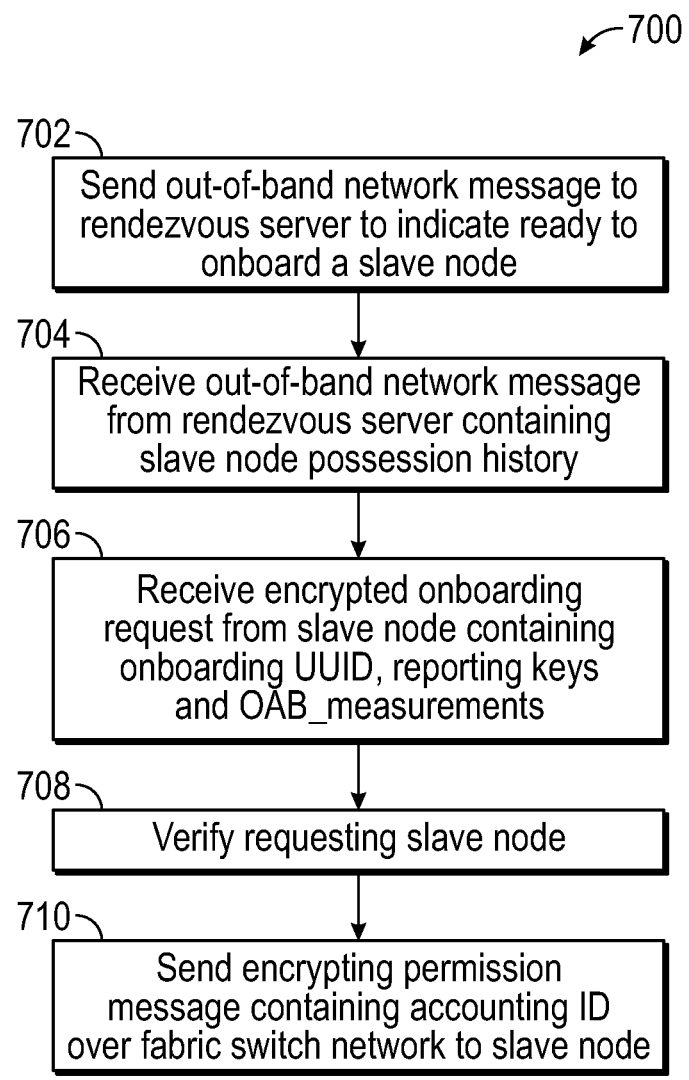
FIG. 7 is an illustrative flow diagram representing an onboarding process performed by the OAB of a fabric switch master.

FIG. 7 is an illustrative flow diagram representing an onboarding process 700 performed by the master OAB 504 of a fabric switch master 510. The flow diagram represents configuration of logic of the fabric switch master's OAB circuit 504. In block 702, fabric switch master's OAB circuit 504 sends an external message over its I/O circuit 308 to the rendezvous server 802 to indicate its readiness to onboard a slave node. In block 704, the fabric switch master's OAB circuit 504 receives an electronic manifest document 804 from the rendezvous server 802 that corresponds to an onboarding slave node from which the rendezvous server 802 has received an onboarding request. The manifest document 804 obtains the rendezvous server. For example, a vendor and a rendezvous provider may create a business agreement wherein the vendor agrees to include electronic connection details and keys enabling the rendezvous server to be accessed by consumers of the manifest. In block 706, the fabric switch master's OAB logic circuit 504 receives over the fabric switch network 104, 104-2 an encrypted onboarding request message that is encrypted with an encryption key, $K_{MFG}$, associated with the onboarding node and that includes the node's onboarding UUID, OAB_measurement information and the onboarding slave node N1's reporting key(s) $K_{N1}$. In block 708, the fabric switch master's OAB logic circuit 504 verifies the attestation of the node's manufacturing source through decryption of the message and also verifies the node's history of possession through the onboarding UUID and the legal ownership transfer history and RFID and electronic tracking history. Upon successful verification, in block 710, the fabric switch master's OAB logic circuit 504 creates an accounting identifier for the onboarding node and creates and sends an onboarding permission message over the fabric switch network 104, 104-2 to the onboarding slave node N1 that includes the onboarding node's reporting key(s), $K_{N1}$, and the newly created accounting identifier, $N1_{AcctID}$.

Figure 8:
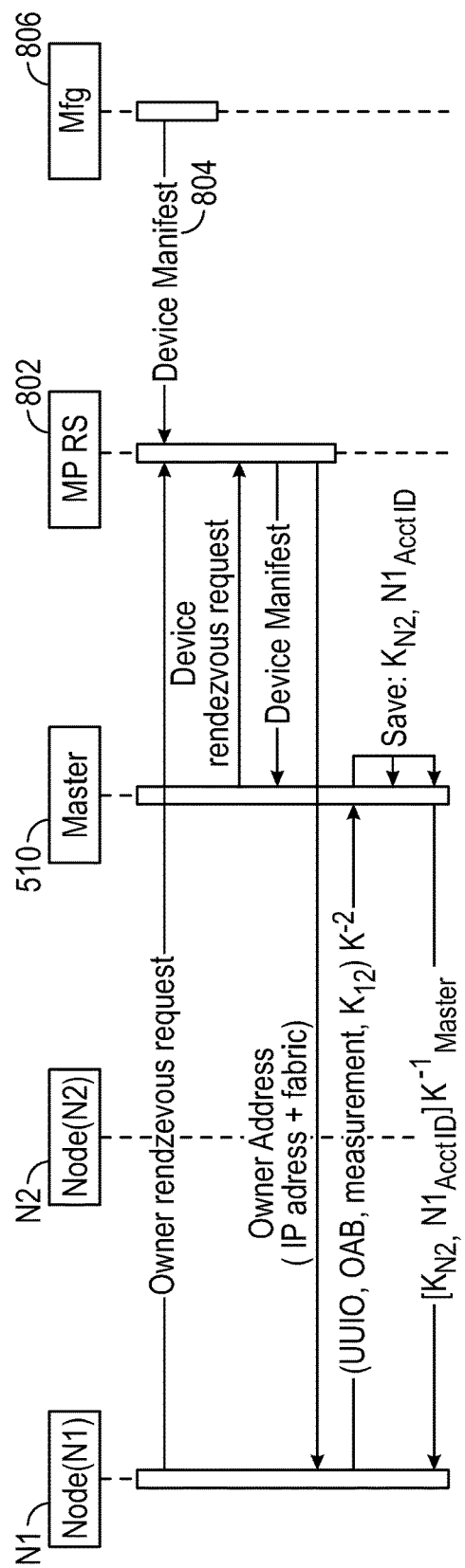
FIG. 8 is an example signal sequence diagram signal flow between an onboarding node, a fabric switch master and a rendezvous server.

FIG. 8 is an illustrative example message signal sequence diagram message signal flow between an onboarding node, a fabric switch master and a rendezvous server. Node N1 is the onboarding node. Slave node N2 is a previously onboarded node. Both N1 and N2 have the same fabric switch master, 510. Onboarding slave node N1's OAB 310 sends an onboarding request over an external communication network 312 such as the Internet, for example, to the rendezvous server 802. In the meantime, the rendezvous server 802 receives from an "Mfg", 806 e.g., an original manufacturer, OEM or vendor, a manifest document 804 that corresponds to the onboarding node N1. Also, the fabric switch master's OAB logic circuit 504 sends to the rendezvous server 802 over the external communication network 312 a message indicating that it is prepared to onboard a slave node. The rendezvous server 802 sends the onboarding slave node N1's manifest over the external communication network 312 to the fabric switch master's OAB 504. The rendezvous server 802 sends to the onboarding slave node N1's OAB 310 the fabric switch master's address, e.g. IP and fabric switch network. The, onboarding slave node N1's OAB 310 sends over the fabric switch network 104, 104-2 to the fabric switch master 510 an encrypted onboarding request message, which contains its onboarding UUID, OAB_measurement information and reporting keys, $K_{N1}$, and which is encrypted with a key, $K_{MFG}$, that indicates the onboarding slave node N1's manufacturer. The fabric switch master verifies the attestation and chain of title of the onboarding slave node N1 based upon the encrypting key, $K_{MFG}$, and the received onboarding UUID. Upon successful verification, the fabric switch master 510 sends over the fabric switch network 104, 104-2 to the onboarding slave node N1 an encrypted message, which includes the onboarding slave node N1's reporting key(s), $K_{N1}$, and an accounting identifier $N1_{AcctID}$, and which is encrypted using the fabric switch master's key $K_{Master}$.

Figure 9:
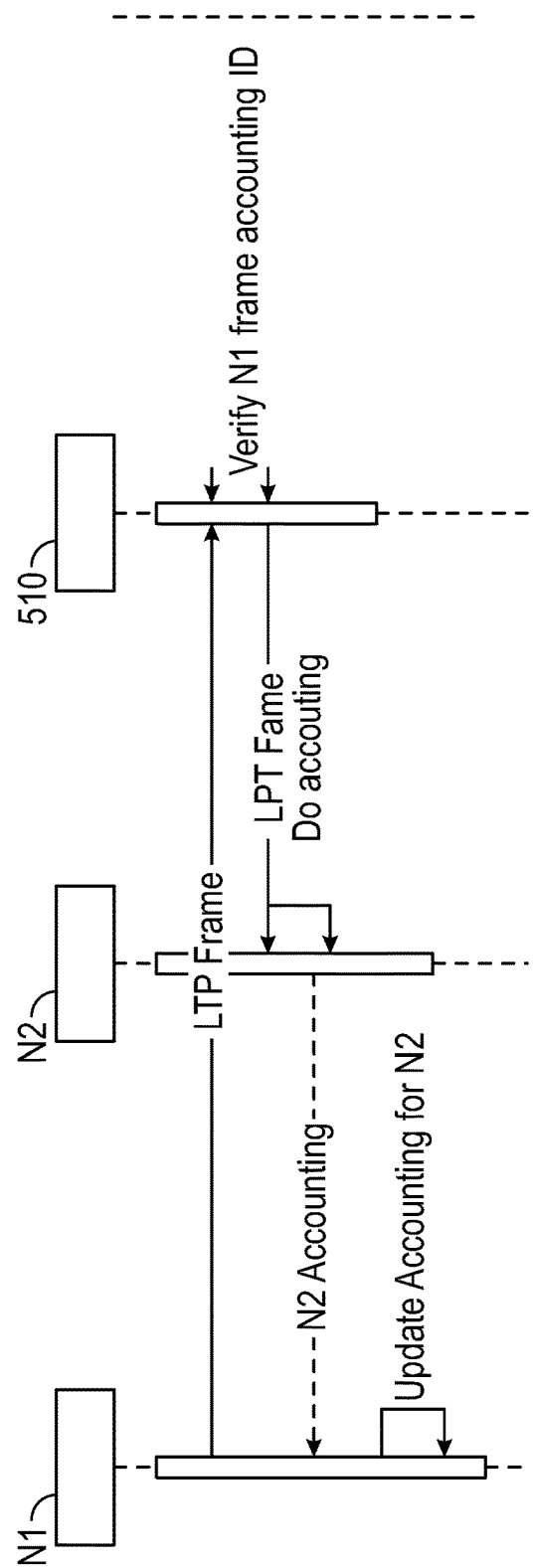
FIG. 9 is an illustrative example signal sequence diagram representing message signal flow between two nodes via their fabric switch master.

FIG. 9 is an illustrative example signal sequence diagram representing message signal flow between two slave nodes, N1, N2 via their fabric switch master 510. Slave node N1 sends over the fabric switch network 104, 104-2 an encrypted Link Transfer Packet (LTP) Frame message addressed to slave node N2, which is signed with slave node N1's reporting key $K_{N1}$. The LTP Frame may be encrypted with N2's RSA encryption key or N1 and N2 may negotiate a session encryption key using Sigma Protocol or some other variant of Diffie-Hellman key exchange or N1 and N2 may encrypt with a session shared between N1 and N2, having been provisioned by the master (fabric switch) or they may encrypt to the master who decrypts and re-encrypts to the destination node N2. In accordance with the master-slave communication protocol used within the fabric switch network 104, 104-2, the message is first transmitted over the fabric switch network 104, 104-2 to the fabric switch master 510. Slave node N1's OAB 310 incorporates the accounting identifier $N1_{AcctID}$ previously assigned to slave node N1 within the LTP Frame message. The fabric switch master 510 decrypts the LTP message, confirms the accuracy of the accounting identifier included in the message, re-encrypts the message with its master key $K_{Master}$ and forwards the encrypted message over the fabric switch network 104, 104-2 to slave node N2. Slave node N2 decrypts the message and stores accounting information involving the received accounting identifier $N1_{AcctID}$. For example, the stored accounting information may involve an indication that the LTP frames was received from a slave node N1, which is associated with accounting identifier $N1_{AcctID}$.

In some embodiments, individual slave nodes' OAB logic circuits 310 may be configured to implement a blockchain by allowing one or more of the slave nodes to also implement blockchain mining functionality. In some embodiments the blockchain mining capability may be implemented in an FPGA or ASIC that is with the node's OAB. 'Miners' are nodes that cooperate to establish that the contents of a message are intended/expected. When a majority of nodes agree similarly the agreement is considered 'consensus truth' that remaining miners accept as correct. Attention is then focused on the next message (aka transaction). Implementation of the agreement protocol between 'miners' is more efficient, secure and reliable in hardware (FPGA, ASIC) than in software. The switch 510 may also perform blockchain mining functions with peer fabric switches possibly performing the same workloads for redundancy and failover continuity. Nodes within a single fabric may perform 'mining' functionality where each node contributes its vote toward consensus truth of a transaction expected result. Nodes seeking to trust other nodes may perform attestation of the node to create a whitelist/blacklist that establishes whether it is appropriate to interact as miners seeking to share in a consensus truth protocol.

The foregoing description and drawings of embodiments are illustrative and it will be understood that various modifications may be made to the embodiments by those skilled in the art without departing from the spirit and scope of this disclosure.

ADDITIONAL NOTES & EXAMPLES

Example 1 is an article of manufacture that includes a storage device that includes information to cause an onboarding slave node to perform a method comprising: receiving a message that includes an address of a fabric switch master over an external network, providing an identification message that provides an indication of a manufacturing source of an onboarding slave node, over the fabric switch network, to a fabric switch master; and receiving, the permission message, over the fabric switch network, from the fabric switch master.

In Example 2, the subject matter of Example 1 optionally includes receiving an accounting identifier over the fabric switch network, from the fabric switch master.

In Example 3, the subject matter of Example 2 optionally includes sending the accounting identifier over the fabric switch network within a message to another node after onboarding is completed.

In Example 4, the subject matter of Example 3 optionally includes storing in a blockchain, accounting information that is associated with the accounting identifier, by the onboarding slave node, after onboarding is completed.

Example 5 is an article of manufacture that includes a storage device that includes information to cause a master node to perform a method comprising: receiving the identification message that provides an indication of a manufacturing source of an onboarding slave node, over the fabric switch network, from the onboarding slave node; and providing a permission message over the fabric switch network, to the identified onboarding slave node.

In Example 6, the subject matter of Example 5 optionally includes verifying, at the fabric switch master, an identity of the onboarding slave node based upon the received identification message.

In Example 7, the subject matter of Example 6 optionally includes wherein providing the permission message further includes providing the permission message in response to a positive verification of an identity of the onboarding slave node.

In Example 8, the subject matter of any one or more of Examples 5-7 optionally include receiving an indication of the history of the onboarding slave node over the external network; and verifying an identity of the onboarding slave node based upon the indicated manufacturing source and the indicated history of possession.

In Example 9, the subject matter of any one or more of Examples 5-8 optionally include sending an accounting identifier over the fabric switch network, to the onboarding slave node.

In Example 10, the subject matter of Example 9 optionally includes verifying after onboarding is completed, that the message sent from the onboarding slave node contains the assigned accounting identifier before routing message to the another slave node of the group.

Example 11 is a method for onboarding and accounting of devices into an HPC fabric, the method comprising: receiving a message that includes an address of a fabric switch master over an external network, providing an identification message that provides an indication of a manufacturing source of an onboarding slave node, over the fabric switch network, to a fabric switch master; and receiving, the permission message, over the fabric switch network, from the fabric switch master.

In Example 12, the subject matter of Example 11 optionally includes receiving an accounting identifier over the fabric switch network, from the fabric switch master.

In Example 13, the subject matter of Example 12 optionally includes sending the accounting identifier over the fabric switch network within a message to another node after onboarding is completed.

In Example 14, the subject matter of Example 13 optionally includes storing in a blockchain, accounting information that is associated with the accounting identifier, by the onboarding slave node, after onboarding is completed.

Example 15 is a method for onboarding and accounting of devices into an HPC fabric, the method comprising: receiving the identification message that provides an indication of a manufacturing source of an onboarding slave node, over the fabric switch network, from the onboarding slave node; and providing a permission message over the fabric switch network, to the identified onboarding slave node.

In Example 16, the subject matter of Example 15 optionally includes verifying, at the fabric switch master, an identity of the onboarding slave node based upon the received identification message.

In Example 17, the subject matter of Example 16 optionally includes wherein providing the permission message further includes providing the permission message in response to a positive verification of an identity of the onboarding slave node.

In Example 18, the subject matter of any one or more of Examples 15-17 optionally include receiving an indication of the history of the onboarding slave node over the external network; and verifying an identity of the onboarding slave node based upon the indicated manufacturing source and the indicated history of possession.

In Example 19, the subject matter of any one or more of Examples 15-18 optionally include sending an accounting identifier over the fabric switch network, to the onboarding slave node.

In Example 20, the subject matter of Example 19 optionally includes verifying after onboarding is completed, that the message sent from the onboarding slave node contains the assigned accounting identifier before routing message to the another slave node of the group.

Example 21 is a system for onboarding and accounting of devices into an HPC fabric, the system comprising: means for receiving a message that includes an address of a fabric switch master over an external network, means for providing an identification message that provides an indication of a manufacturing source of an onboarding slave node, over the fabric switch network, to a fabric switch master; and means for receiving, the permission message, over the fabric switch network, from the fabric switch master.

In Example 22, the subject matter of Example 21 optionally includes means for receiving an accounting identifier over the fabric switch network, from the fabric switch master.

In Example 23, the subject matter of Example 22 optionally includes means for sending the accounting identifier over the fabric switch network within a message to another node after onboarding is completed.

In Example 24, the subject matter of Example 23 optionally includes means for storing in a blockchain, accounting information that is associated with the accounting identifier, by the onboarding slave node, after onboarding is completed.

Example 25 is a system for onboarding and accounting of devices into an HPC fabric, the system comprising: means for receiving the identification message that provides an indication of a manufacturing source of an onboarding slave node, over the fabric switch network, from the onboarding slave node; and means for providing a permission message over the fabric switch network, to the identified onboarding slave node.

In Example 26, the subject matter of Example 25 optionally includes means for verifying, at the fabric switch master, an identity of the onboarding slave node based upon the received identification message.

In Example 27, the subject matter of Example 26 optionally includes wherein the means for providing the permission message further includes means for providing the permission message in response to a positive verification of an identity of the onboarding slave node.

In Example 28, the subject matter of any one or more of Examples 25-27 optionally include means for receiving an indication of the history of the onboarding slave node over the external network; and means for verifying an identity of the onboarding slave node based upon the indicated manufacturing source and the indicated history of possession.

In Example 29, the subject matter of any one or more of Examples 25-28 optionally include means for sending an accounting identifier over the fabric switch network, to the onboarding slave node.

In Example 30, the subject matter of Example 29 optionally includes means for verifying after onboarding is completed, that the message sent from the onboarding slave node contains the assigned accounting identifier before routing message to the another slave node of the group.

Example 31 is a high performance computing system comprising: a fabric switch network that includes a master fabric switch; and a group of slave nodes each including a central processing unit (CPU), a fabric controller to route messages over the fabric switch network to other members of the group to the master fabric switch, an input/output (I/O) circuit coupled to communicate messages over an external network, and a slave onboarding and accounting (OAB) logic block; wherein the fabric switch master is to route messages between slave nodes of the group over the fabric switch network, and includes an I/O circuit coupled to communicate messages over an external network, and includes a master OAB logic block; wherein a slave OAB logic circuit of at least one slave node is operative during onboarding of its slave node to: receive a fabric switch master address message over the at least one slave node's I/O circuit, and provide an identification message, over the at least one slave node's fabric controller to the fabric switch master, and receive, over the at least one slave node's fabric controller, a permission message from the fabric switch master; and wherein the master OAB logic circuit is operative during onboarding of the at least one slave node to: receive the identification message, over its switch master's fabric controller, from the at least one slave node, and provide the permission message, over the fabric switch master's fabric controller, to the identified at least one slave node.

In Example 32, the subject matter of Example 31 optionally includes wherein the at least one slave node identification message provides an indication of a manufacturing source of the at least one slave node.

In Example 33, the subject matter of any one or more of Examples 31-32 optionally include wherein a slave OAB logic circuit of at least one slave node is further operative during onboarding of its slave node to encrypt the onboarding slave node identification message with an encryption key that provides an indication of a manufacturing source of an onboarding slave node.

In Example 34, the subject matter of any one or more of Examples 31-33 optionally include wherein the master OAB logic circuit is further operative during onboarding of the at least one slave node to verify an identity of the at least one slave node based upon the received identification message.

In Example 35, the subject matter of any one or more of Examples 31-34 optionally include wherein the master OAB logic circuit is further operative during onboarding of the at least one slave node to: verify an identity of the at least one slave node based upon the received identification message, and provide the onboarding slave node permission message, over the fabric switch master's fabric controller to the at least one slave node, in response to a positive verification of an identity of the at least one slave node.

In Example 36, the subject matter of any one or more of Examples 31-35 optionally include wherein a slave OAB logic circuit of at least one slave node is further operative during onboarding of its slave node to provide in a message, over the at least one slave node's fabric controller, an indication of a history of possession of the at least one slave node; and wherein the master OAB logic circuit is further operative during onboarding of the at least one slave node to receive, over the fabric switch master's I/O circuit, an indication within a message of the history of possession of the at least one slave node.

In Example 37, the subject matter of any one or more of Examples 31-36 optionally include wherein the at least one identification message provides an indication of a manufacturing source of the at least one slave node; wherein a slave OAB logic circuit of at least one slave node is further operative during onboarding of its slave node to provide in the identification message an indication of a history of possession of the at least one slave node; and wherein the master OAB logic circuit is further operative during onboarding of the at least one slave node to: verify an identity of the at least one slave node based upon the indicated manufacturing source and the indicated history of possession of the at least one slave node, and provide the onboarding slave node permission message, over the fabric switch master's fabric controller to the at least one slave node, in response to positive verifications of identity and history of possession of the at least one slave node.

In Example 38, the subject matter of any one or more of Examples 31-37 optionally include wherein a slave OAB logic circuit of at least one slave node is further operative during onboarding of its slave node to receive from the fabric switch master, over the at least one slave node's fabric controller, an accounting identifier; and wherein the master OAB logic circuit is further operative during onboarding of the at least one slave node to assign and send the accounting identifier, over the fabric switch master's fabric controller, to the at least one slave node.

In Example 39, the subject matter of Example 38 optionally includes wherein a slave OAB logic circuit of at least one slave node is further operative during onboarding of its slave node to receive the accounting identifier within an encrypted message; and wherein the master OAB logic circuit is further operative during onboarding of the at least one slave node to encrypt a message that includes the accounting identifier.

In Example 40, the subject matter of any one or more of Examples 38-39 optionally include wherein the slave OAB logic circuit of at least one slave node is operative during normal of its slave node to include the accounting identifier with messages sent to other nodes within the group of slave nodes, over the at least one slave node's fabric controller.

In Example 41, the subject matter of Example 40 optionally includes wherein the master OAB logic circuit is operative during normal operation to verify that a message received from the at least one slave node contains the assigned accounting identifier before routing message to another slave node of the group.

In Example 42, the subject matter of any one or more of Examples 40-41 optionally include wherein the slave OAB logic circuit of at least one slave node is operative during normal of its slave node to store accounting information associated with an accounting identifier in a blockchain.

Example 43 is a method to onboard a slave node to a high performance computing system comprising: receiving a message that includes an address of a fabric switch master, at an onboarding slave node, over an external network, providing an identification message, by the onboarding slave node, over the fabric switch network, to the fabric switch master; receiving the identification message, at the fabric switch master, over the fabric switch network, from the onboarding slave node; providing a permission message, by the fabric switch master, over the fabric switch network, to the identified onboarding slave node; and receiving, the permission message, at the onboarding slave node, over the fabric switch network, from the fabric switch master.

In Example 44, the subject matter of Example 43 optionally includes wherein the identification message provides an indication of a manufacturing source of the onboarding slave node.

In Example 45, the subject matter of any one or more of Examples 43-44 optionally include encrypting the identification message with an encryption key that provides an indication of a manufacturing source of an onboarding slave node.

In Example 46, the subject matter of Examples 43-45 optionally includes verifying, at the fabric switch master, an identity of the onboarding slave node based upon the received identification message.

In Example 47, the subject matter of Examples 43-46 optionally includes wherein providing the permission message further includes providing the permission message in response to a positive verification of an identity of the onboarding slave node.

In Example 48, the subject matter of Examples 43-47 optionally includes wherein providing the identification message, at the onboarding slave further includes providing an indication of a manufacturing source of the onboarding slave node and providing, with the identification message, an indication of a history of possession of the onboarding slave node; and further including: receiving an indication of the history of the onboarding slave node, at the fabric switch master, over the external network; and verifying, at the fabric switch master, an identity of the onboarding slave node based upon the indicated manufacturing source and the indicated history of possession.

In Example 49, the subject matter of Examples 43-48 optionally includes receiving an accounting identifier, at the onboarding slave node, over the fabric switch network, from the fabric switch master; and sending an accounting identifier, by the fabric switch master, over the fabric switch network, to the onboarding slave node.

In Example 50, the subject matter of Examples 43-49 optionally includes including the accounting identifier within a message sent, by the onboarding slave node, after onboarding is completed, over the fabric switch network, to another node within the group of slave nodes.

In Example 51, the subject matter of Examples 43-50 optionally includes verifying, by the fabric switch master, after onboarding is completed, that the message sent from the onboarding slave node contains the assigned accounting identifier before routing message to the another slave node of the group.

In Example 52, the subject matter of Examples 43-51 optionally includes storing in a blockchain, accounting information that is associated with the accounting identifier, by the onboarding slave node, after onboarding is completed.

Example 53 is at least one machine-readable medium including instructions, which when executed by a machine, cause the machine to perform operations of any of the methods of Examples 11-20.

Example 54 is at least one machine-readable medium including instructions, which when executed by a machine, cause the machine to perform operations of any of the methods of Examples 43-52.

Example 55 is an apparatus comprising means for performing any of the methods of Examples 11-20.

Example 56 is an apparatus comprising means for performing any of the methods of Examples 43-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An article of manufacture that includes a storage device that includes information to cause an onboarding slave node to perform a method comprising:
   receiving a message that includes an address of a fabric switch master over an external network;
   providing an identification message that provides an indication of a manufacturing source of an onboarding slave node, over the fabric switch network, to the fabric switch master;
   receiving, the permission message, over the fabric switch network, from the fabric switch master;
   receiving an accounting identifier over the fabric switch network, from the fabric switch master; and
   sending the accounting identifier over the fabric switch network within a message to another node after onboarding is completed.

2. The article of claim 1 further including:
   storing in a blockchain, accounting information that is associated with the accounting identifier, by the onboarding slave node, after onboarding is completed.

3. An article of manufacture that includes a storage device that includes information to cause a master node to perform a method comprising:
   receiving the identification message that provides an indication of a manufacturing source of an onboarding slave node, over the fabric switch network, from the onboarding slave node;
   receiving an indication of the history of the onboarding slave node over the external network;
   verifying an identity of the onboarding slave node based upon the indicated manufacturing source and the indicated history of possession; and
   providing a permission message over the fabric switch network, to the identified onboarding slave node.

4. The article of claim 3 further including:
   verifying, at the fabric switch master, an identity of the onboarding slave node based upon the received identification message.

5. The article of claim 4, wherein providing the permission message further includes providing the permission message in response to a positive verification of an identity of the onboarding slave node.

6. The article of claim 3 further including:
   sending an accounting identifier over the fabric switch network, to the onboarding slave node.

7. The article of claim 6 further including:
   verifying after onboarding is completed, that the message sent from the onboarding slave node contains the assigned accounting identifier before routing message to another slave node of the group.

8. A high performance computing system comprising:
a fabric switch network that includes a master fabric switch; and
a group of slave nodes each including a central processing unit (CPU), a fabric controller to route messages over the fabric switch network to other members of the group to the master fabric switch, an input/output (I/O) circuit coupled to communicate messages over an external network, and a slave onboarding and accounting (OAB) logic block:
wherein the fabric switch master is to route messages between slave nodes of the group over the fabric switch network, and includes an I/O circuit coupled to communicate messages over an external network, and includes a master OAB logic block;
wherein a slave OAB logic circuit of at least one slave node is operative during onboarding of its slave node to:
receive a fabric switch master address message over the at least one slave node's I/O circuit, and
provide an identification message, over the at least one slave node's fabric controller to the fabric switch master, and
receive, over the at least one slave node's fabric controller, a permission message from the fabric switch master; and
wherein the master OAB logic circuit is operative during onboarding of the at least one slave node to:
receive the identification message, over its switch master's fabric controller, from the at least one slave node, and
provide the permission message, over the fabric switch master's fabric controller, to the identified at least one slave node.

9. The system of claim 8, wherein the at least one slave node identification message provides an indication of a manufacturing source of the at least one slave node.

10. The system of claim 8, wherein a slave OAB logic circuit of at least one slave node is further operative during onboarding of its slave node to encrypt the onboarding slave node identification message with an encryption key that provides an indication of a manufacturing source of an onboarding slave node.

11. The system of claim 8, wherein the master OAB logic circuit is further operative during onboarding of the at least one slave node to verify an identity of the at least one slave node based upon the received identification message.

12. The system of claim 8, wherein the master OAB logic circuit is further operative during onboarding of the at least one slave node to:
verify an identity of the at least one slave node based upon the received identification message, and
provide the onboarding slave node permission message, over the fabric switch master's fabric controller to the at least one slave node, in response to a positive verification of an identity of the at least one slave node.

13. The system of claim 8, wherein a slave OAB logic circuit of at least one slave node is further operative during onboarding of its slave node to provide in a message, over the at least one slave node's fabric controller, an indication of a history of possession of the at least one slave node; and
wherein the master OAB logic circuit is further operative during onboarding of the at least one slave node to receive, over the fabric switch master's I/O circuit, an indication within a message of the history of possession of the at least one slave node.

14. The system of claim 8, wherein the at least one identification message provides an indication of a manufacturing source of the at least one slave node;
wherein a slave OAB logic circuit of at least one slave node is further operative during onboarding of its slave node to provide in the identification message an indication of a history of possession of the at least one slave node; and
wherein the master OAB logic circuit is further operative during onboarding of the at least one slave node to:
verify an identity of the at least one slave node based upon the indicated manufacturing source and the indicated history of possession of the at least one slave node, and
provide the onboarding slave node permission message, over the fabric switch master's fabric controller to the at least one slave node, in response to positive verifications of identity and history of possession of the at least one slave node.

15. The system of claim 8, wherein a slave OAB logic circuit of at least one slave node is further operative during onboarding of its slave node to receive from the fabric switch master, over the at least one slave node's fabric controller, an accounting identifier; and
wherein the master OAB logic circuit is further operative during onboarding of the at least one slave node to assign and send the accounting identifier, over the fabric switch master's fabric controller, to the at least one slave node.

16. The system of claim 15, wherein a slave OAB logic circuit of at least one slave node is further operative during onboarding of its slave node to receive the accounting identifier within an encrypted message; and
wherein the master OAB logic circuit is further operative during onboarding of the at least one slave node to encrypt a message that includes the accounting identifier.

17. The system of claim 15, wherein the slave OAB logic circuit of at least one slave node is operative during normal of its slave node to include the accounting identifier with messages sent to other nodes within the group of slave nodes, over the at least one slave node's fabric controller.

18. The system of claim 17, wherein the master OAB logic circuit is operative during normal operation to verify that a message received from the at least one slave node contains the assigned accounting identifier before routing message to another slave node of the group.

19. The system of claim 17, wherein the slave OAB logic circuit of at least one slave node is operative during normal of its slave node to store accounting information associated with an accounting identifier in a blockchain.

20. A method to onboard a slave node to a high performance computing system comprising:
receiving a message that includes an address of a fabric switch master, at an onboard slave node, over an external network;
providing an identification message, by the onboarding slave node, over the fabric switch network, to the fabric switch master;
encrypting the identification message with an encryption key that provides an indication of a manufacturing source of an onboarding slave node;
receiving the identification message, at the fabric switch master, over the fabric switch network, from the onboarding slave node;

providing a permission message, by the fabric switch master, over the fabric switch network, to the identified onboarding slave node; and receiving, the permission message, at the onboarding slave node, over the fabric switch network, from the fabric switch master.

21. The method of claim 20, wherein the identification message provides an indication of a manufacturing source of the onboarding slave node.

* * * * *

UNITED STATES PATENT AND TRADEMARK OFFICE
CERTIFICATE OF CORRECTION

PATENT NO. : 10,341,348 B2  
APPLICATION NO. : 15/392379  
DATED : July 2, 2019  
INVENTOR(S) : Smith et al.

Page 1 of 1

It is certified that error appears in the above-identified patent and that said Letters Patent is hereby corrected as shown below:

In the Claims

Column 14, Line 65, Claim 7, delete "claim6" and insert --claim 6-- therefor

Column 15, Line 12, Claim 8, delete "block:" and insert --block;-- therefor

Column 16, Line 57, Claim 20, delete "onboard" and insert --onboarding-- therefor Signed and Sealed this
Twenty-first Day of April, 2020

Andrei Iancu
*Director of the United States Patent and Trademark Office*